United States Patent [19]
Hill et al.

[11] Patent Number: 5,710,976
[45] Date of Patent: Jan. 20, 1998

[54] METHOD AND APPARATUS FOR REDUCING NOISE INTERFERENCE TO IMPROVE OUTBOUND MESSAGE RELIABILITY IN A TWO-WAY MESSAGING SYSTEM

[75] Inventors: Thomas Casey Hill, Wellington; Thomas V. D'Amico, Boca Raton, both of Fla.

[73] Assignee: Motorola, Inc., Schaumburg, Ill.

[21] Appl. No.: 588,502

[22] Filed: Jan. 18, 1996

[51] Int. Cl.⁶ .................................................. H04Q 7/36
[52] U.S. Cl. .................. 455/56.1; 455/38.1; 455/62; 455/63
[58] Field of Search ...................... 455/33.1, 33.2, 455/33.4, 34.1, 54.1, 54.2, 56.1, 62, 63, 38.1; 379/59, 60; 340/825.44

[56] References Cited

U.S. PATENT DOCUMENTS

| | | | |
|---|---|---|---|
| 4,875,038 | 10/1989 | Siwiak et al. | 340/825.44 |
| 5,230,082 | 7/1993 | Ghisler et al. | 455/34.1 |
| 5,278,991 | 1/1994 | Ramsdale et al. | 455/54.1 |
| 5,392,453 | 2/1995 | Gudmundson et al. | 455/33.2 |
| 5,396,645 | 3/1995 | Huff | 455/34.1 |
| 5,491,834 | 2/1996 | Chia | 455/56.1 |

*Primary Examiner*—Edward F. Urban
*Attorney, Agent, or Firm*—R. Louis Breeden

[57] ABSTRACT

A method and apparatus is used for transmitting an outbound message in a two-way messaging system having a plurality of cells employing frequency reuse. The outbound message is transmitted to a selective call transceiver (122) utilizing a first frequency reuse plan (312). The two-way messaging system awaits a positive acknowledgment (316, 318) from the selective call transceiver (122) confirming that the outbound message was received with an acceptable quality. The two-way messaging system retransmits the outbound message to the selective call transceiver (122) utilizing a second frequency reuse plan (332), in response to receiving a negative acknowledgment and also in response to failing to receive any acknowledgment within a predetermined time after transmitting the outbound message.

21 Claims, 7 Drawing Sheets

METHOD AND APPARATUS FOR REDUCING NOISE INTERFERENCE TO IMPROVE OUTBOUND MESSAGE RELIABILITY IN A TWO-WAY MESSAGING SYSTEM

RELATED APPLICATIONS

Application Ser. No. 08/476,771 filed Jun. 7, 1995 by Wang, entitled "Method and Apparatus for Scheduling Message Traffic in a Multicell Radio Communication System."

Application Ser. No. 08/500,280, now U.S. Pat. No. 5,649,289, filed Jul. 10, 1995 by Wang et al., entitled "Flexible Mobility Management in a Two-Way Messaging System and Method Therefor."

Application Ser. No. 08/502,399 filed Jul. 14, 1995 by Wang et al., entitled "System and Method for Allocating Frequency Channels in a Two-Way Messaging System."

FIELD OF THE INVENTION

This invention relates in general to two-way messaging systems, and in particular to two-way messaging systems employing frequency reuse.

BACKGROUND OF THE INVENTION

Current two-way messaging systems use frequency reuse to maximize the communication capacity of the system. The frequency reuse pattern traditionally includes a fixed number of communication cells. As the number of communication cells in the frequency reuse pattern decreases, the system capacity increases, as well as the noise interference of the communication system. In contrast, as the number of communication cells in the frequency reuse pattern increases, the system capacity decreases, as well as the noise interference.

The noise interference includes co-channel and adjacent channel interference. Co-channel interference occurs from communication cells utilizing the same communication frequency. Adjacent channel interference occurs from adjacent frequency channels where harmonic noise is coupled between channels.

Currently selective call transceivers within the messaging system which experience severe noise interference cannot receive messages until the interference subsides, or the users of the selective call transceivers move to another location where the interference is less substantial. This situation can result in message latencies that are inconsistent with customer expectations.

Thus, what is needed is a method and apparatus that substantially reduces noise interference within the two-way messaging system thereby increasing the probability of message delivery to the selective call transceivers experiencing interference. In particular, the method and apparatus must maintain system capacity as high as possible, while at the same time decreasing system noise interference.

SUMMARY OF THE INVENTION

An aspect of the present invention is a method of transmitting an outbound message in a two-way messaging system having a plurality of cells employing frequency reuse. The method comprises the steps of transmitting the outbound message utilizing a first frequency reuse plan throughout the plurality of cells, awaiting a positive acknowledgment confirming that the outbound message was received with an acceptable quality, and retransmitting the outbound message utilizing a second frequency reuse plan throughout the plurality of cells, in response to receiving a negative acknowledgment and also in response to failing to receive any acknowledgment within a predetermined time after transmitting the outbound message.

A second aspect of the present invention is a controller for transmitting an outbound message in a two-way messaging system having a plurality of cells employing frequency reuse. The controller comprises a processing system for directing operation of the controller, an input interface coupled to the processing system for accepting the outbound message originated by a user, a transceiver interface coupled to the processing system for controlling a base transceiver for transmitting the outbound message and for receiving an acknowledgment response, and a timer coupled to the processing system for controlling the processing system to await a positive acknowledgment confirming that the outbound message was received with an acceptable quality. The processing system is programmed for transmitting the outbound message utilizing a first frequency reuse plan throughout the plurality of cells, and wherein the processing system is programmed for retransmitting the outbound message utilizing a second frequency reuse plan throughout the plurality of cells, in response to receiving a negative acknowledgment and also in response to failing to receive any acknowledgment within a predetermined time after transmitting the outbound message.

A third aspect of the present invention is a two-way messaging system for transmitting an outbound message, the two-way messaging system having a plurality of cells employing frequency reuse. The two-way messaging system comprises a controller for controlling operation of the two-way messaging system, a plurality of base transceivers coupled to the controller for transmitting the outbound message and for receiving an acknowledgment response, and a selective call transceiver coupled by radio with at least one of the plurality of base transceivers for receiving the outbound message and for generating the acknowledgment response. The controller comprises a processing system for directing operation of the controller, an input interface coupled to the processing system for accepting the outbound message originated by a user, a transceiver interface coupled to the processing system for controlling the plurality of base transceivers for transmitting the outbound message and for receiving the acknowledgment response, and a timer coupled to the processing system for controlling the processing system to await a positive acknowledgment confirming that the outbound message was received with an acceptable quality. The processing system is programmed for transmitting the outbound message utilizing a first frequency reuse plan, and wherein the processing system is programmed for retransmitting the outbound message utilizing a second frequency reuse plan, in response to receiving a negative acknowledgment and also in response to failing to receive any acknowledgment within a predetermined time after transmitting the outbound message.

DESCRIPTION OF THE PREFERRED EMBODIMENT

Figure 1:
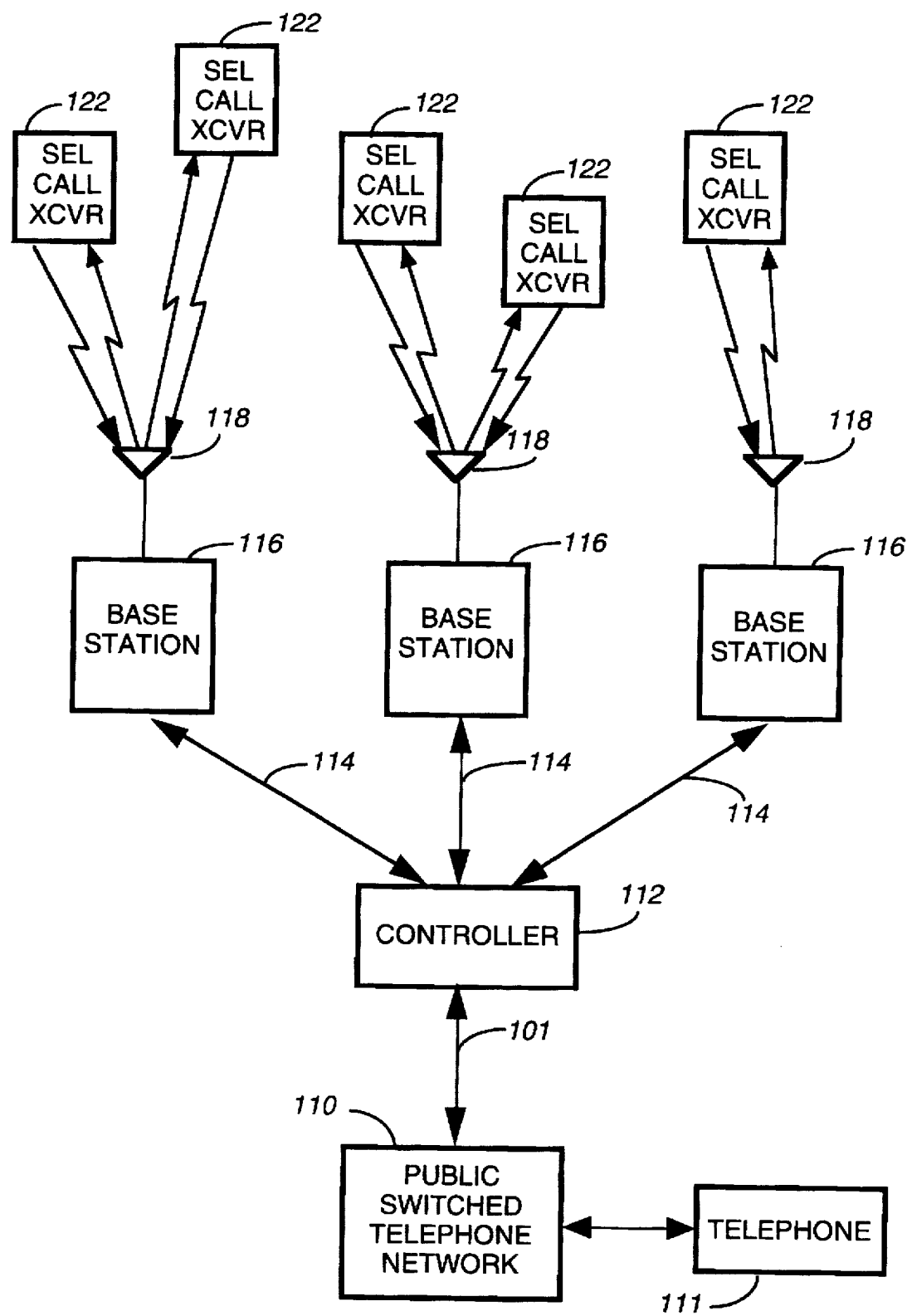
FIG. 1 is an electrical block diagram of a two-way messaging system in accordance with the preferred embodiment of the present invention.

FIG. 1 is an electrical block diagram of a two-way messaging system in accordance with the preferred embodiment of the present invention. The two-way messaging system comprises a fixed portion including a controller 112 and a plurality of base stations 116, and a portable portion including a plurality of selective call transceivers 122. The base stations 116 are used for communicating with the selective call transceivers 122 utilizing conventional radio frequency (RF) techniques, and coupled by communication links 114 to the controller 112 which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized for the controller 112 and the base stations 116.

Each of the base stations 116 transmits RF signals to the selective call transceivers 122 via a transceiver antenna 118. The base stations 116 each receive RF signals from the plurality of selective call transceivers 122 via the transceiver antenna 118. The RF signals transmitted by the base stations 116 to the selective call transceivers 122 (outbound messages) comprise selective call addresses identifying the selective call transceivers 122, and data or voice messages originated by a caller. The RF signals transmitted by the selective call transceivers 122 to the base stations 116 (inbound messages) comprise positive acknowledgments (ACKs) which indicate the message was received reliably by the selective call transceiver 122, or negative acknowledgments (NAKs) which indicate the selective call transceiver 122 did not receive the message reliably, or detected poor signal quality strength.

A detailed description of inbound acknowledge-back messaging is more fully described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call originations therefrom. Selective call originations comprising voice and data messages from the PSTN 110 can be generated, for example, from a conventional telephone 111 coupled to the PSTN 110.

The outbound and inbound messages are preferably similar to Motorola's well-known REFLEX™ digital selective call signaling protocol. This protocol utilizes well-known error detection and error correction techniques and is therefore tolerant to bit errors occurring during transmission, provided that the bit errors are not too numerous in any one code word.

Figure 2:
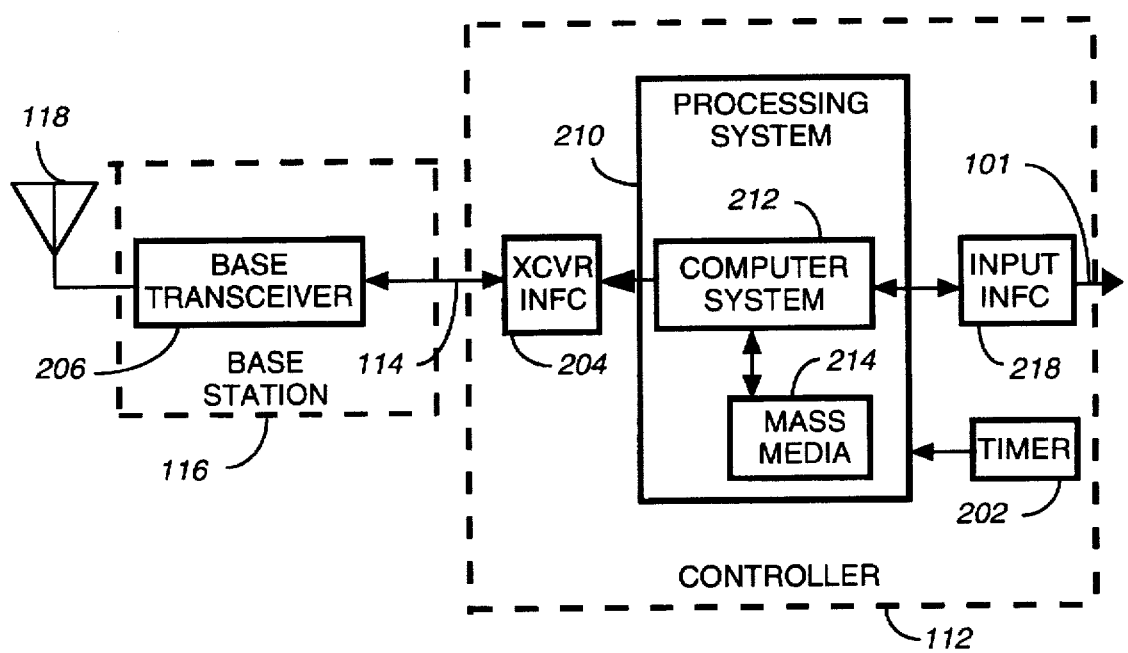
FIG. 2 is an electrical block diagram of a controller and a base station in accordance with the preferred embodiment of the present invention.

FIG. 2 is an electrical block diagram 200 of the controller 112 and the base station 116 in accordance with the preferred embodiment of the present invention. The controller 112 includes a processing system 210, a transceiver interface 204, an input interface 218, and a timer 202. The base station 116 includes a base transceiver 206.

The processing system 210 is used for directing operation of the controller 112. The processing system 210 preferably is coupled through the transceiver interface 204 to the base transceiver 206 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few.

The base transceiver 206 utilizes conventional means for transmitting outbound messages to the selective call transceiver 122, and for receiving inbound messages (or acknowledgment responses) transmitted by the selective call transceivers 122. The processing system 210 is also coupled to the input interface 218 for accepting the outbound message originated by a user communicating with the PSTN 110 through the telephone links 101.

The timer 202 is coupled to the processing system 210 for controlling the processing system 210 to await positive acknowledgments from the selective call transceiver(s) 122 confirming that the outbound message(s) was received with an acceptable quality.

In order to perform the functions necessary for controlling the elements of the controller 112, as well as the elements of the base stations 116, the processing system 210 preferably includes a conventional computer system 212, and conventional mass storage media 214. The conventional mass storage media 214 includes, for example, subscriber user information such as selective call transceiver 122 addressing, programming options, and tables of groups of selective call transceivers 122 for transmitting different frequency reuse patterns as will be described below.

The conventional computer system 212 is preferably programmed by way of software included in the conventional mass storage media 214. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing messages originated by callers using the PSTN 110, processing acknowledgments received from the selective call transceivers 122, and for protocol processing of messages destined for the selective call transceivers 122, just to mention a few. The conventional mass storage media 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210.

The processing system 210 is programmed for transmitting the outbound message utilizing a first frequency reuse plan. In response to receiving a negative acknowledgment, or in response to failing to receive the positive acknowledgment within a predetermined time determined by the timer 202, the processing system 210 is programmed for retransmitting the outbound message utilizing a second frequency reuse plan.

Figure 3:
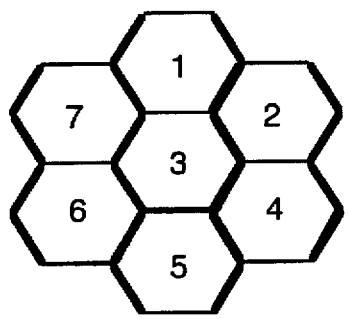
FIGS. 3, 4, and 5 are examples of frequency reuse patterns utilized by the two-way messaging system.
Figure 4:
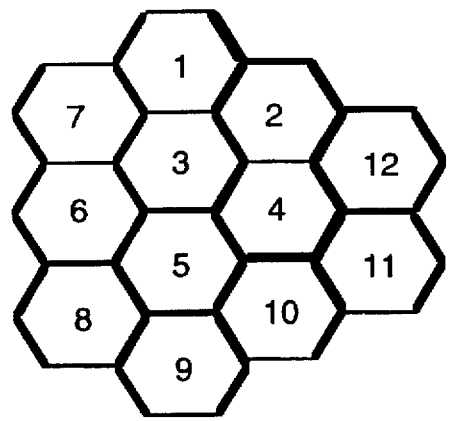
Figure 5:
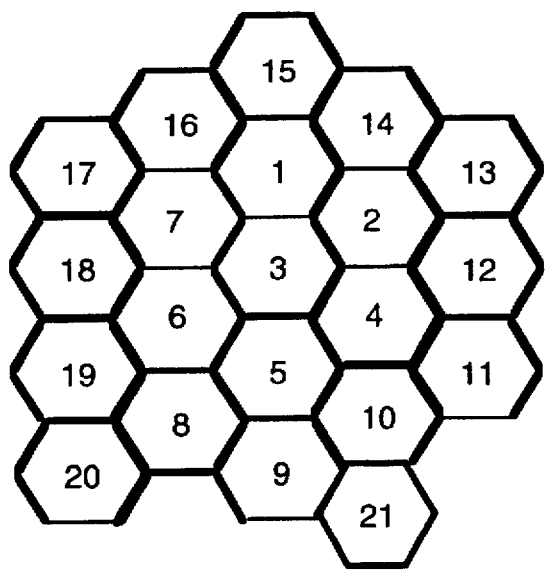

FIGS. 3, 4, and 5 are examples of a two-way messaging system having a plurality of cells employing frequency reuse patterns. FIG. 3 illustrates a frequency reuse pattern with seven cells. If, for example, the two-way messaging system has twenty-one communication frequencies, then each cell would utilize three unique frequencies. As the seven cells are repeated throughout the communication system, each cell receives several sources of communication interference.

These sources include co-frequency (or co-channel) interference, and adjacent channel interference. Co-channel interference is caused by multiple cells utilizing the same communication frequency. The communication system is designed to place cells utilizing the same communication frequency as far apart as allowed by the frequency reuse pattern. Adjacent channel interference occurs from communication frequencies that are adjacent to each other in the frequency spectrum. The final form of interference always present in the two-way messaging system is transceiver noise inherent in the base transceivers 206 and selective call transceivers 122.

Co-channel and adjacent channel interference can be reduced by changing the frequency reuse pattern. For example, FIG. 4 illustrates a frequency reuse pattern including twelve cells. In a two-way messaging system utilizing twenty-one communication frequencies, each cell could use an average of 1.75 frequencies. The change in the frequency reuse pattern reduces the system capacity by approximately 42 percent. However, the distance between cells utilizing the same communication frequencies has been increased thereby reducing co-channel interference. In addition, since there are fewer frequencies present within each cell, adjacent channel interference is reduced.

FIG. 5 is a frequency reuse pattern utilizing twenty-one cells. In a two-way messaging system utilizing twenty-one communication frequencies, each cell of the reuse pattern would use one unique frequency. This frequency reuse pattern reduces the system capacity to one-third of that available in the seven cell frequency reuse pattern. However, as before, co-channel and adjacent channel interference is significantly reduced.

Given a propagation loss exponent of 3.5, a seven cell frequency reuse pattern has approximately a 15 dB signal-to-interference (S/I) ratio. A twelve cell frequency reuse pattern has approximately a 19 dB S/I ratio, and a twenty-one cell frequency reuse pattern has approximately a 24 dB S/I ratio. Thus, when one or more selective call transceivers 122 are experiencing severe interference, an alteration of the frequency reuse pattern can reduce the interference and allow for communication to be completed. Altering the frequency reuse also increases the maximum capacity of the system by reducing the number of retries performed for units experiencing severe interference.

Figure 6:
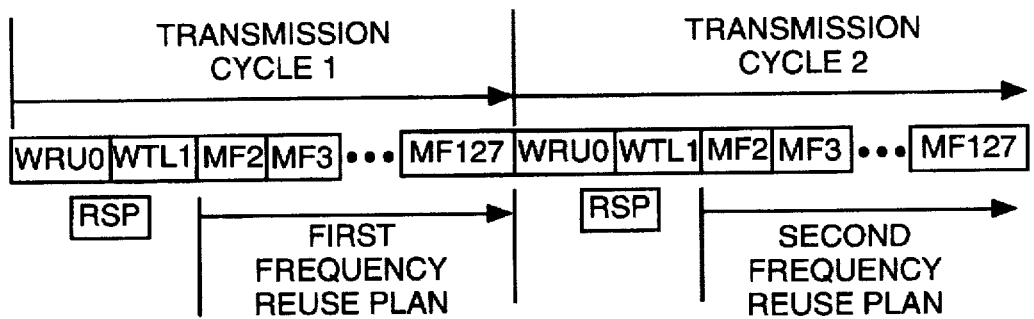
FIGS. 6, 7 and 8 are timing diagrams of frequency reuse plans utilized by the two-way messaging system in accordance with the present invention.
Figure 7:
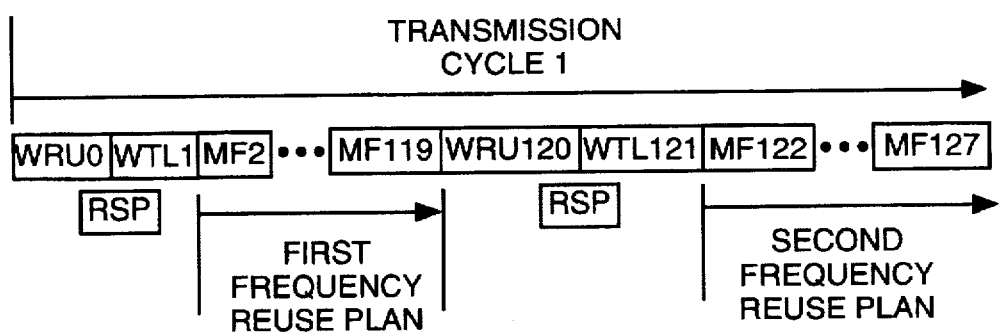
Figure 8:
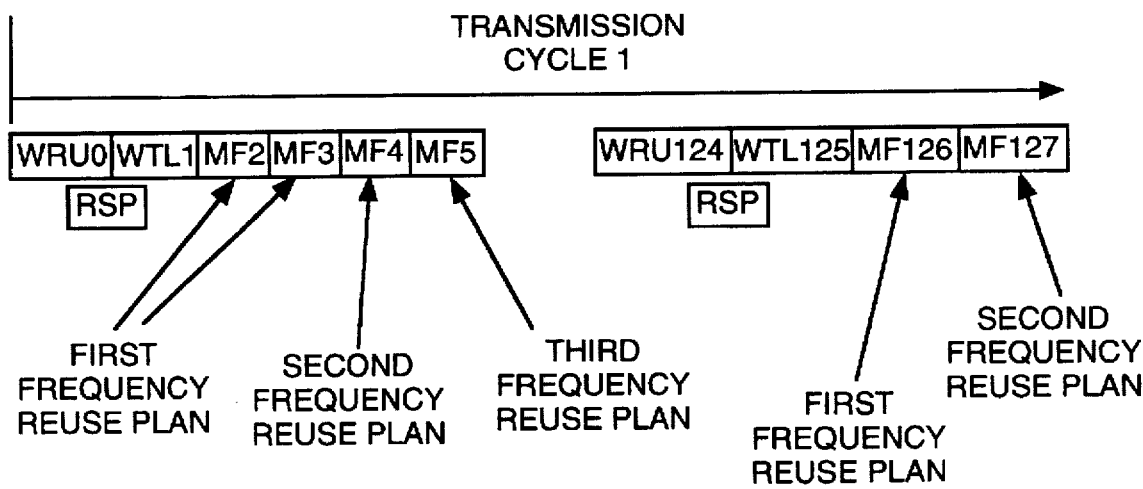

FIGS. 6, 7 and 8 illustrate timing diagrams for three embodiments which utilize different frequency reuse schemes for communicating with selective call transceivers 122 experiencing interference problems. The first frequency reuse plan has a first signal-to-interference ratio. The second frequency reuse plan has a second signal-to-interference ratio that is higher than the first signal-to-interference ratio, and the third frequency reuse plan has a third signal-to-interference ratio that is higher than the first and second signal-to-interference ratios of the first and second frequency reuse plans. The first frequency reuse plan can be, for example, the seven cell frequency reuse pattern of FIG. 3, whereas the second frequency reuse plan can be the twelve cell frequency reuse pattern of FIG. 4, and the third frequency reuse plan can be the twenty-one cell frequency reuse pattern of FIG. 5.

In the timing diagram of FIG. 6, the processing system 210 is programmed for transmitting a plurality of outbound messages in a plurality of transmission cycles. Each transmission cycle comprises a plurality of synchronous frames. These synchronous frames include control frames such as "Where aRe YoU" frames, or "Where To Listen" frames (shown as WRU and WTL, respectively), and message frames (shown as MF2, MF3, etc. by way of example). Each transmission cycle comprises, for example, one-hundred-twenty-eight synchronous frames.

Within a transmission cycle the selective call transceivers 122 respond to control frames on a response channel (shown as RSP by way of example). The response channel (or inbound channel) utilizes conventional time division multiplexing (TDM), or can alternatively utilize conventional frequency division multiplexing (FDM). In this illustration the response channel (RSP) utilizes TDM and FDM transmission.

In the embodiment of FIG. 6, selected ones of the plurality of transmission cycles utilize the second frequency reuse plan. The processing system 210 is programmed for retransmitting the outbound message during one of the selected ones of the plurality of transmission cycles. Each transmission cycle transmits messages in either the first frequency reuse plan, or the second frequency reuse plan. In this example, transmission cycle 1 transmits messages utilizing the first frequency reuse plan, and transmission cycle 2 transmits messages utilizing the second frequency reuse plan.

During transmission cycle 1, a WRU0 frame is transmitted to a group of selective call transceivers 122 requesting acknowledgment responses. For those selective call transceivers 122 that acknowledge, a WTL frame (WTL0) is transmitted indicating the corresponding message frame positions (e.g., MF2, MF3, etc.) and frequencies to be utilized for each selective call transceiver 122. The message frames are then transmitted to each selective call transceiver 122 utilizing a first frequency reuse plan. The selective call transceivers 122 then respond with an inbound message (not shown) corresponding to an ACK or NAK indicating the integrity of the message received.

The selective call transceivers 122 that do not respond within a predetermined time determined by the timer 202, or that respond with NAKs are placed in a table stored in the memory of the processing system 210. The table defines a group of selective call transceivers 122 that NAK'd messages transmitted in the first frequency reuse plan. In the next transmission cycle (i.e., transmission cycle 2) the processing system 210 is programmed for retransmitting outbound messages corresponding to this group of selective call transceivers 122 utilizing the second frequency reuse plan.

Although this embodiment substantially eliminates communication interference problems experienced by a group of selective call transceivers 122, it can result in longer latency periods for transmitting outbound messages. For example, a synchronous system which utilizes one-hundred-twenty-eight frames per transmission cycle (as in the above example) with a frame duration of 1.875 seconds results in a transmission cycle period of four minutes. Thus, selective call transceivers 122 which cannot be contacted within the first transmission cycle may experience a delay of four minutes or more to receive message in the next transmission cycle.

The second embodiment shown in FIG. 7 provides a faster means of communicating outbound messages to selective call transceivers 122 experiencing interference problems. In this embodiment at least one first portion of a transmission cycle utilizes the first frequency reuse plan and at least one second portion of the transmission cycle utilizes the second frequency reuse plan. The first portion includes at least one frame of the plurality of synchronous frames utilizing the first frequency reuse plan, whereas the second portion includes at least one other frame of the plurality of synchronous frames utilizing the second frequency reuse plan. The processing system 210 is programmed for sending outbound messages during the at least one other frame.

In this illustration, transmission cycle 1 has two sets of control frames (WRU0, WTL1 and WRU120, WTL 121). Similar to the timing diagram of FIG. 6, messages (MF2 through MF119) are transmitted to the selective call transceivers 122 utilizing the first frequency reuse plan. The group of selective call transceivers 122 which do not respond, or send a NAK response are queried by WRU120 for retransmission of messages. Once the selective call transceivers 122 have been told by WTL121 where to receive the retransmission of messages, the message frames (MF122 through MF127) are transmitted utilizing the second frequency reuse plan. In this embodiment, the latency of communicating with selective call transceivers 122 experiencing interference problems is significantly reduced, because communication occurs within the same transmission cycle.

The third embodiment shown in FIG. 8 utilizes the embodiment of FIG. 7 and further allows for multiple frequency reuse plans within a contiguous set of message frames. In addition, the processing system 210 is programmed to group the outbound messages of selective call transceivers 122 that NAK messages in the same transmission cycle with other outbound messages from previous transmission cycles to be retransmitted, thereby forming a group of outbound messages for retransmission.

In this example, message frames MF2 and MF3 initiated on transmission cycle 1 are transmitted utilizing the first frequency reuse plan. Message frames MF4 and MF5 are transmitted utilizing a second and third frequency reuse plan, respectively. MF4 can be, for example, a first message retransmission from one previous transmission cycle, whereas MF5 can be, for example, a second message retransmission from two previous transmission cycles. Moreover, several WRU and WTL frames can occur within the same transmission cycle with separate groups of messages intended for first transmission, and messages intended for a plurality of retransmissions utilizing a plurality of frequency reuse plans.

It will be appreciated that for the three embodiments described above there can be more than three frequency reuse plans when it is appropriate in the two-way communication system. It will be further appreciated that a transmission cycle can include less or more than one-hundred-twenty-eight frames.

Figure 9:
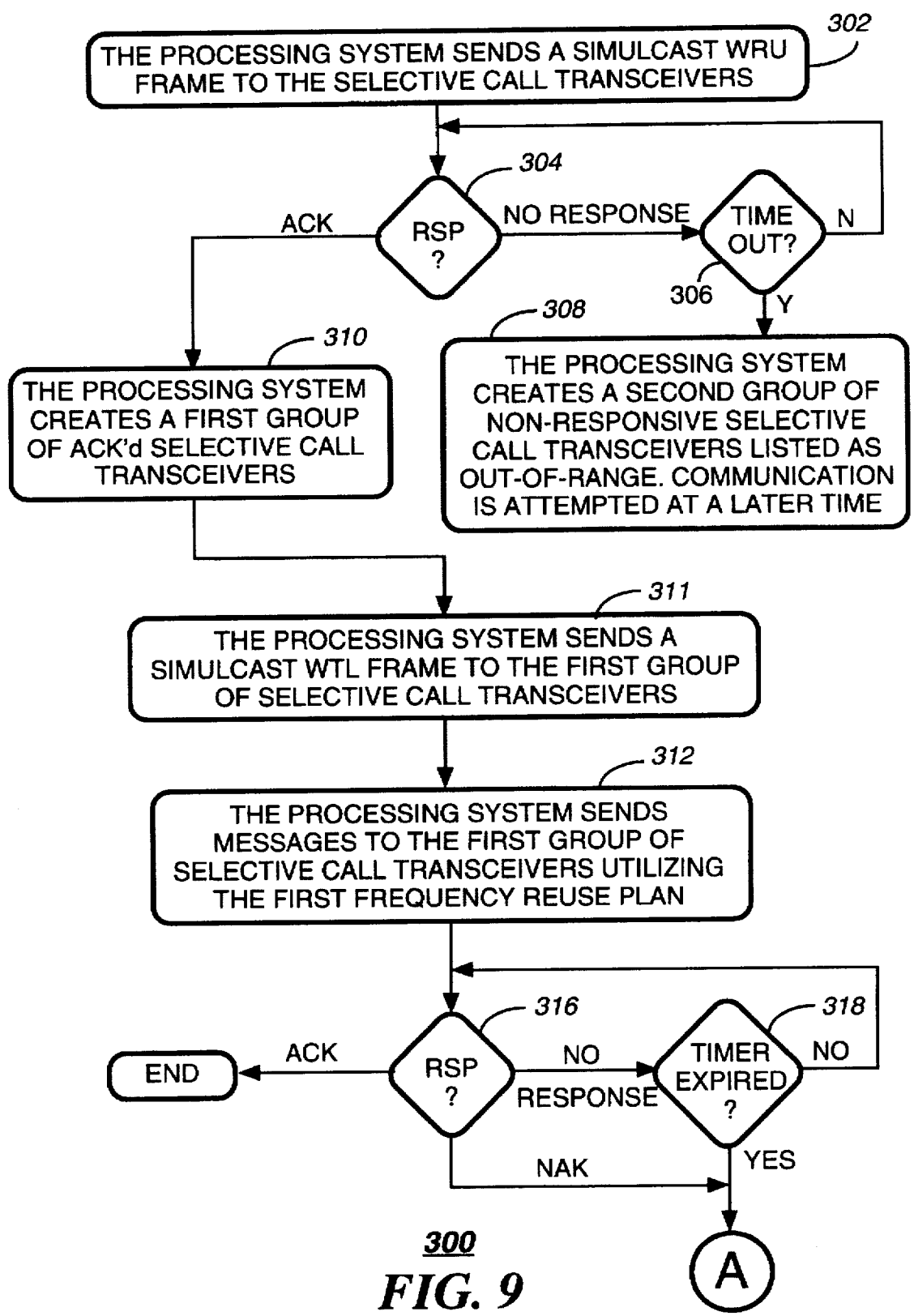
FIGS. 9, 10 and 11 depict a flow chart of the controller operation in accordance with the preferred embodiment of the present invention.
Figure 10:
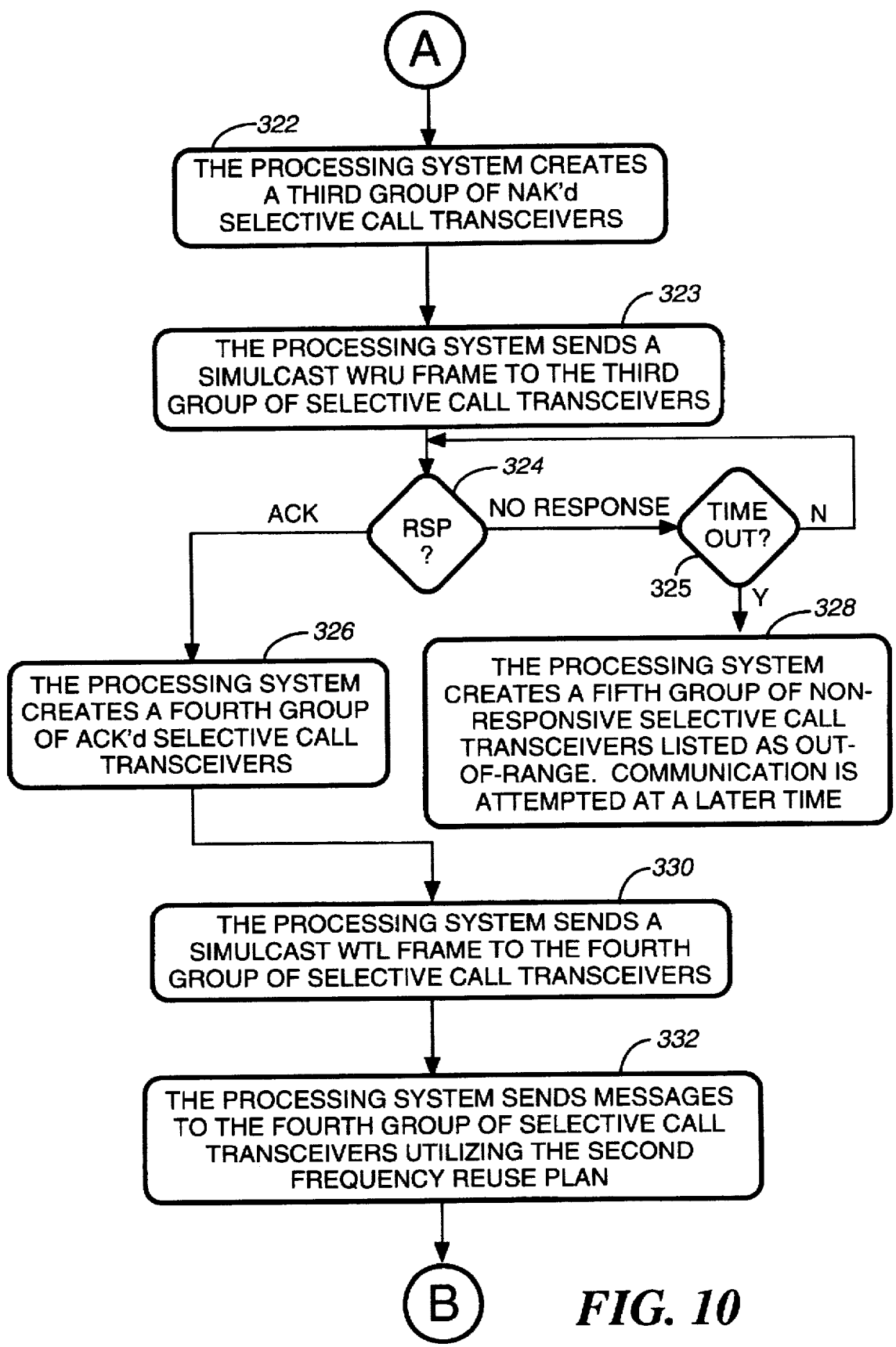
Figure 11:
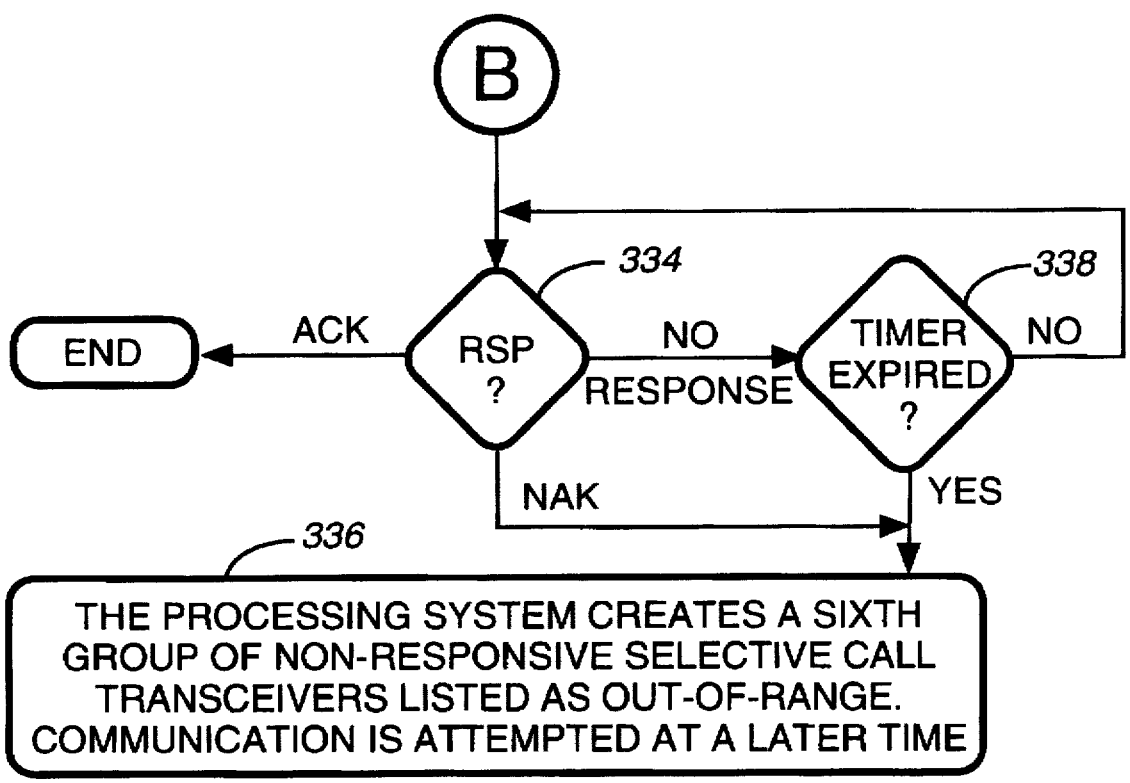

FIGS. 9, 10 and 11 depict a flow chart 300 of the controller 112 operation in accordance with the preferred embodiment of the present invention. The flow chart 300 begins with step 302 where the processing system 210 sends a simulcast WRU frame by way of the base stations 116 on a control frame with the first frequency reuse plan to the selective call transceivers 122. The processing system 210 awaits an acknowledgment response from the selective call transceivers 122 in step 304. If no response is given by a selective call transceiver 122 before a time out 306, then the processing system 210 proceeds to step 308 where the processing system 210 creates a table including a second group of NAK'd or non-responsive selective call transceivers 122 listed as out-of-range. Communication with this group of selective call transceivers 122 is attempted at a later time. For those selective call transceivers 122 which ACK'd, the processing system 210 proceeds to step 310 where the processing system 210 creates a table including a first group of ACK'd selective call transceivers 122.

In step 311 the processing system 210 sends a simulcast WTL frame to the first group of selective call transceivers 122. Following the simulcast WTL frames, in step 312, the processing system 210 sends messages by way of the base stations 116 to the first group of selective call transceivers 122 utilizing the first frequency reuse plan. In steps 316 and 318 the processing system 210 awaits for ACKs, NAKs, or no response from the first group of selective call transceivers 122. For selective call transceivers 122 that ACK the transmitted messages, the processing system 210 discontinues processing. For selective call transceivers 122 that either NAK or give no response within a predetermined time defined by the timer 202, the processing system 210 proceeds to step 322 in FIG. 10.

In step 322 the processing system 210 creates a third group of NAK'd selective call transceivers 122. In step 323 the processing system 210 sends a simulcast WRU frame to the third group of selective call transceivers 122 to relocate them within the communication system. The processing system 210 awaits an acknowledgment response from the selective call transceivers 122 in step 324. If no response is given by a selective call transceiver 122 before a time out 325, then the processing system 210 proceeds to step 328 where the processing system 210 creates a table including a fifth group of NAK'd or non-responsive selective call transceivers 122 listed as out-of-range. Communication with this group of selective call transceivers 122 is attempted at a later time. For those selective call transceivers 122 which ACK'd, the processing system 210 proceeds to step 326 where the processing system 210 creates a table including a fourth group of ACK'd selective call transceivers 122.

In step 330 the processing system 210 sends a simulcast WTL frame to the fourth group of selective call transceivers 122. The processing system 210 then sends messages to the fourth group of selective call transceivers 122 utilizing the second frequency reuse plan in step 332. In steps 334 and 338 the processing system 210 awaits for ACKs, NAKs, or no response from the fourth group of selective call transceivers 122. For selective call transceivers 122 that ACK the transmitted messages, the processing system 210 discontinues processing. For selective call transceivers 122 that either NAK or give no response within a predetermined time defined by the timer 202, the processing system 210 proceeds to step 336 and creates a sixth group of non-responsive selective call transceivers 122 listed as out-of-range. Communication with these units is attempted at a later time.

It will be appreciated that, alternatively, steps 323, 324, 325, 326, and 328 can be eliminated from the transmission processes. Instead, the processing system 210 can estimate that the majority of the NAK'd selective call transceivers 122 of step 322 are still within the same cells, and retransmission can occur immediately. It will be further appreciated that the two frequency reuse plans given in this illustration can be augmented as appropriate to improve the reliability of message delivery to selective call transceivers 122 experiencing interference.

Thus, it should be apparent by now that the present invention provides a novel method for substantially reducing communication interference in a communication system utilizing frequency reuse. In particular, the invention provides a method wherein any number of frequency reuse plans can be selected by the controller to facilitate communication with selective call transceivers which are experiencing communication interference. In addition, by dynamically and quickly adjusting the frequency reuse plans, and by grouping ACK'd selective call transceivers apart from NAK'd or non-responsive selective call transceivers, the communication system maximizes system capacity while maintaining communication with selective call transceivers experiencing interference.

What is claimed is:

1. A method of transmitting an outbound message in a two-way messaging system having a plurality of cells employing frequency reuse, the method comprising the steps of:

transmitting the outbound message utilizing a first frequency reuse plan throughout the plurality of cells;

awaiting a positive acknowledgment confirming that the outbound message was received with an acceptable quality; and retransmitting the outbound message utilizing a second frequency reuse plan throughout the plurality of cells, in response to receiving a negative acknowledgment and also in response to failing to receive any acknowledgment within a predetermined time after transmitting the outbound message.

2. The method of claim 1, wherein the first frequency reuse plan has a first signal-to-interference ratio, and wherein the second frequency reuse plan has a second signal-to-interference ratio that is higher than the first signal-to-interference ratio.

3. The method of claim 1, wherein the messaging system transmits a plurality of outbound messages in a plurality of transmission cycles, and wherein selected ones of the plurality of transmission cycles utilize the second frequency reuse plan, and wherein the retransmitting step comprises the step of retransmitting the outbound message during one of the selected ones of the plurality of transmission cycles.

4. The method of claim 1, wherein the messaging system transmits a plurality of outbound messages in a plurality of transmission cycles, and wherein at least one first portion of a transmission cycle utilizes the first frequency reuse plan and at least one second portion of the transmission cycle utilizes the second frequency reuse plan, and wherein the retransmitting step comprises the step of retransmitting the outbound message during the at least one second portion of the transmission cycle.

5. The method of claim 1, wherein the retransmitting step comprises the steps of:
   grouping the outbound message with other outbound messages to be retransmitted, thereby forming a group of outbound messages for retransmission; and
   retransmitting the group of outbound messages utilizing the second frequency reuse plan.

6. The method of claim 1, wherein message system transmits a plurality of outbound messages in a plurality of transmission cycles, and wherein a transmission cycle comprises a plurality of synchronous frames, and wherein at least one frame of the plurality of synchronous frames utilizes the first frequency reuse plan, and wherein at least one other frame of the plurality of synchronous frames utilizes the second frequency reuse plan, and wherein the retransmitting step comprises the step of sending the outbound message during the at least one other frame.

7. The method of claim 6, wherein the retransmitting step comprises the steps of:
   grouping the outbound message with other outbound messages to be retransmitted, thereby forming a group of outbound messages for retransmission; and
   retransmitting the group of outbound messages during the at least one other frame.

8. A controller for transmitting an outbound message in a two-way messaging system having a plurality of cells employing frequency reuse, the controller comprising:

a processing system for directing operation of the controller;

an input interface coupled to the processing system for accepting the outbound message originated by a user;

a transceiver interface coupled to the processing system for controlling a base transceiver for transmitting the outbound message and for receiving an acknowledgment response; and a timer coupled to the processing system for controlling the processing system to await a positive acknowledgment confirming that the outbound message was received with an acceptable quality, wherein the processing system is programmed for transmitting the outbound message utilizing a first frequency reuse plan throughout the plurality of cells, and wherein the processing system is programmed for retransmitting the outbound message utilizing a second frequency reuse plan throughout the plurality of cells, in response to receiving a negative acknowledgment and also in response to failing to receive any acknowledgment within a predetermined time after transmitting the outbound message.

9. The controller of claim 8, wherein the first frequency reuse plan has a first signal-to-interference ratio, and wherein the second frequency reuse plan has a second signal-to-interference ratio that is higher than the first signal-to-interference ratio.

10. The controller of claim 8, wherein the processing system is programmed for transmitting a plurality of outbound messages in a plurality of transmission cycles, and wherein selected ones of the plurality of transmission cycles utilize the second frequency reuse plan, and wherein the processing system is further programmed for retransmitting the outbound message during one of the selected ones of the plurality of transmission cycles.

11. The controller of claim 8, wherein the processing system is programmed for transmitting a plurality of outbound messages in a plurality of transmission cycles, and wherein at least one first portion of a transmission cycle utilizes the first frequency reuse plan and at least one second portion of the transmission cycle utilizes the second frequency reuse plan, and wherein the processing system is further programmed for retransmitting the outbound message during the at least one second portion of the transmission cycle.

12. The controller of claim 8, wherein the processing system is programmed for:
    grouping the outbound message with other outbound messages to be retransmitted, thereby forming a group of outbound messages for retransmission; and retransmitting the group of outbound messages utilizing the second frequency reuse plan.

13. The controller of claim 8,
wherein the processing system is programmed for transmitting a plurality of outbound messages in a plurality of transmission cycles, and
wherein a transmission cycle comprises a plurality of synchronous frames, and
wherein at least one frame of the plurality of synchronous frames utilizes the first frequency reuse plan, and
wherein at least one other frame of the plurality of synchronous frames utilizes the second frequency reuse plan, and
wherein the processing system is further programmed for sending the outbound message during the at least one other frame.

14. The controller of claim 13,
wherein the processing system is further programmed for:
grouping the outbound message with other outbound messages to be retransmitted, thereby forming a group of outbound messages for retransmission; and
retransmitting the group of outbound messages during the at least one other frame.

15. A two-way messaging system for transmitting an outbound message, the two-way messaging system having a plurality of cells employing frequency reuse, the two-way messaging system comprising:
a controller for controlling operation of the two-way messaging system;
a plurality of base transceivers coupled to the controller for transmitting the outbound message and for receiving an acknowledgment response; and
a selective call transceiver coupled by radio with at least one of the plurality of base transceivers for receiving the outbound message and for generating the acknowledgment response;
wherein the controller comprises:
a processing system for directing operation of the controller;
an input interface coupled to the processing system for accepting the outbound message originated by a user;
a transceiver interface coupled to the processing system for controlling the plurality of base transceivers for transmitting the outbound message and for receiving the acknowledgment response; and
a timer coupled to the processing system for controlling the processing system to await a positive acknowledgment confirming that the outbound message was received with an acceptable quality,
wherein the processing system is programmed for transmitting the outbound message utilizing a first frequency reuse plan, and
wherein the processing system is programmed for retransmitting the outbound message utilizing a second frequency reuse plan, in response to receiving a negative acknowledgment and also in response to failing to receive any acknowledgment within a predetermined time after transmitting the outbound message.

16. The two-way messaging system of claim 15,
wherein the first frequency reuse plan has a first signal-to-interference ratio, and
wherein the second frequency reuse plan has a second signal-to-interference ratio that is higher than the first signal-to-interference ratio.

17. The two-way messaging system of claim 15,
wherein the processing system is programmed for transmitting a plurality of outbound messages in a plurality of transmission cycles, and
wherein selected ones of the plurality of transmission cycles utilize the second frequency reuse plan, and
wherein the processing system is further programmed for retransmitting the outbound message during one of the selected ones of the plurality of transmission cycles.

18. The two-way messaging system of claim 15,
wherein the processing system is programmed for transmitting a plurality of outbound messages in a plurality of transmission cycles, and
wherein at least one first portion of a transmission cycle utilizes the first frequency reuse plan and at least one second portion of the transmission cycle utilizes the second frequency reuse plan, and
wherein the processing system is further programmed for retransmitting the outbound message during the at least one second portion of the transmission cycle.

19. The two-way messaging system of claim 15,
wherein the processing system is programmed for:
grouping the outbound message with other outbound messages to be retransmitted, thereby forming a group of outbound messages for retransmission; and
retransmitting the group of outbound messages utilizing the second frequency reuse plan.

20. The two-way messaging system of claim 15,
wherein the processing system is programmed for transmitting a plurality of outbound messages in a plurality of transmission cycles, and
wherein a transmission cycle comprises a plurality of synchronous frames, and
wherein at least one frame of the plurality of synchronous frames utilizes the first frequency reuse plan, and
wherein at least one other frame of the plurality of synchronous frames utilizes the second frequency reuse plan, and
wherein the processing system is further programmed for sending the outbound message during the at least one other frame.

21. The two-way messaging system of claim 20,
wherein the processing system is further programmed for:
grouping the outbound message with other outbound messages to be retransmitted, thereby forming a group of outbound messages for retransmission; and
retransmitting the group of outbound messages during the at least one other frame.

* * * * *